Patented Jan. 25, 1938

2,106,257

UNITED STATES PATENT OFFICE 2,106,257

FILTER FOR FILTER TYPE RESPIRATORS

Nathan Schwartz, New York, N. Y.

No Drawing. Application October 3, 1936,
Serial No. 103,905

8 Claims. (Cl. 252—2)

This invention relates to the improvement of filters used in filter type respirators, gas masks or the like that make use in the process of filtration, textile fabrics of cotton, wool, felt, rayon, silk, porous paper, or the like.

The object of the invention is to increase the efficiency of the filter.

Another object is to increase the efficiency of the filter without materially increasing the resistance to air flow.

A further object is to prepare fabric or paper filtering materials by means of chemical and physical processing for the purpose of enhancing its filtering quality.

With these and other objects in view which may be incident to these improvements, the invention consists in the processes to be hereinafter set forth and claimed with the understanding that the several features and ingredients comprising the invention may be varied in substance, degree and proportion without departing from the spirit and scope of the appended claims.

The preparing process is with a knowledge that textile fabrics of wool, cotton and felt have certain impurities of vegetable oils or animal fats that may have or do have retarding influences on filtering efficiency.

*Method of preparing the fabric.*—Spray the fabric with a 2% silver protein solution (mild). Spray the said solution to both sides of the fabric to a point of saturation and allow the fabric to dry. Instead of spraying the fabric, the said fabric may be dipped into the 2% silver protein solution and allowed to become saturated with the said solution, after the saturation remove the fabric and cause or permit it to dry.

Silver protein solution (mild) is a U. S. P. preparation. The silver is held in colloidal suspension by means of a protein, or it may be said that the composition is a colloidal dispersion of silver in a protein. This preparation has a mild oxidizing action on filter fabric, the fatty impurities such as animal or vegetable fats or oils are removed by the oxidizing action of the silver. Furthermore the fabric tissue filtering efficiency is increased due to an activating effect by the said colloidal silver.

Colloidal silver is the preferred oxidizing agent. It is most effective. Other metals in colloidal suspension also have beneficial effect. For example; iron, tin, copper and zinc may be used. It appears that the conductors of electricity are the most suitable metals.

A protein preparation, preferably a solution of white of egg is the preferred colloidal medium for holding metallic elements, because metallic elements have a physical affinity for protein, at times the said affinity may be a chemical one.

The standard method of preparing silver proteinum mite, as given in the United States Dispensatory is satisfactory for my purposes. The method is as follows: Freshly prepared silver chloride is reduced by means of formaldehyde in the presence of potassium carbonate and dried in vacuo. A very fine powder of reduced silver is obtained which is at times referred to as "molecular silver". The protein preparation is made as follows: An egg is boiled to hard consistency and the white part is dissolved by means of pepsin hydrochloric acid solution. The proportion is one percent hydrochloric acid and 5% pepsin. Add enough of the enzyme solution to the white of egg to make a clear solution, and then add the freshly prepared "molecular silver" in the proportion of 19 to 25 percent, to the reduced protein solution, that is, to the white of egg solution.

It is to be noted that any mild oxidizing chemical agent will have beneficial effect in that they remove the objectionable oils and fats from the filter fabric. By mild is meant non-destructive. For example $\frac{1}{10}$% of nitric acid will be beneficial while 10% nitric acid will be destructive. Other oxidizing agents are dilute solutions of potassium permanganate, silver nitrate, acetic acid, etc.

It has been stated that the filter fabric is treated with a colloidal silver protein preparation and allowed to dry. This constitutes an improved filter fabric. Further improvements may be added. Namely, apply heat at about 375 degrees centigrade and at the same time apply about 50 pounds pressure for at least 15 minutes. The heat and pressure is best applied while the treated filter fabric still contains a little moisture.

The browned filter fabric produced by this heat and pressure treatment has increased efficiency and has better texture and is in condition for further treatments. Namely, it may be treated with lamp black, protein, or other suitable neutralizers or filterers.

Thus I have produced an improved filter fabric and one that is in condition to be further treated, with special filterers. Now I go further and apply heat to the filter fabric at about 450 degrees centigrade and at about 100 pounds pressure and for a period of 20 minutes. A blackening of the fabric occurs, and one may call it a toasting or carbonizing process.

*Method.*—Place the fabric between two linen sheets on an ironing board apply a flat iron at about 450 degrees centigrade and at about 100 pound pressure for at least 20 minutes. What occurs is that the heat and pressure break up the carbohydrate content of the fibrous filter fabric liberating water. In large part oxygen from the air combines and oxidizes the oily or fatty contents of the fabric and also combines with the organic element of the fabric. The carbon remains in a physical combination whereas before it was in a chemical combination. It is to be understood that a complete carbonization is not brought about. Namely about 35% of the carbon is acted upon.

Therefore by the toasting or carbonizing process I produce a filter fabric which has an improved efficiency in filtering, but it is more brittle and is not practical for use per se, as it readily sheds the carbonized lint or fibers.

It is therefore necessary to enclose the carbonized fabric between layers of gauze, silk bolting, porous cotton, browned filter, rayon, or other filtering fabrics, and in this arrangement it makes a very efficient filterer.

It is to be noted that the addition of a colloidal silver preparation, or of another metallic colloidal prepartion to the filter fabric prior to toasting or carbonizing the same will cause a firmer and more efficient carbonized filter. It may be mentioned that besides colloidal silver, iron also has very decided advantage in that they both produce electromagnetic influences in connection with the carbon, which influences create the separating and filtering quality of the fabric.

It is to be understood that the same chemical and physical reactions occur in both the first preparing or browning process as in the second called toasting or carbonizing process. The first process is mainly useful for preparing an efficient fabric for impregnation or for treatments, such as for treatment with lamp black or other filterers or neutralizers.

It is to be noted that the treatments thus far outlined are adaptable to all porous filter fabrics or paper materials. However, a greater improvement is obtainable by the application of an acidified proteolitic enzyme to fabrics containing wool and cotton fibrous tissues such as felt fabrics. These fabrics contain a rather large percentage of vegetable and animal protein, and their presence retards efficiency of the filter. When the said proteins are reduced to proteoses and peptones the filter efficiency is increased.

*Method for reducing the proteins.*—Prepare a solution containing 2% hydrochloric acid and 5% proteolytic enzyme. The proteolytic enzyme may be an animal or a vegetable enzyme, namely, pepsin or caroid. Spray the preparation onto both sides of the fabric. Spray on a sufficient amount to saturate same. Apply heat at 40 degrees centigrade for an hour. At the end of one hour a 50 pound pressure for 5 minutes may be profitably applied. This process may be called the enzymotic process, and it is preferably the first one to be applied to fabrics containing proteins and this process is to be followed by the application of the silver protein and the browning process, or the carbonizing process.

It may also be mentioned that the heat and pressure application in the browning and the carbonizing process are causative in some reduction of the proteins to proteoses and peptones, but not in sufficient amount for my purposes.

It is to be noted that the reason I accomplish an improvement in the efficiency of the fabric without a relative increase in the resistance to air flow is that by the several processes I have eliminated substances that have no filtration value. For example, fats and oils cause a large amount of resistance but they have no filtration value. Also the vegetable and the animal proteins have been in large part reduced to proteoses and peptones. The latter substances apparently have more filtering qualities. Also I have added a metallic and a carbon element and these elements have absorbing and combining powers for the extraneous matter, that is to be separated or filtered. It seems they have electromagnetic qualities for filtrations, whereby they increase filtration efficiency without increasing the resistance to air flow.

It is to be noted that while the word absorption was used in the previous paragraph it is really adsorption that takes place. That is, the improved filter fabric adds the extraneous poisonous substance to its composition and releases the said substance from the said composition. Namely, during inspiration the improved filter attracts the poisonous substance. Specifically, carbon attracts ammonia, silver in colloidal dispersion attracts silica dust. These are specific instances, and it is also true that carbon attracts to a large extent any fume, and colloidal silver any dust.

It is also to be noticed that unreduced proteins have an adverse influence on filtration while reduced proteins have a beneficial influence on filtration. Specifically the reduced proteins have adsorption qualities and attract the poisonous fumes containing the metals, such as lead, arsenic, tin, antimony etc. More specifically I may say that it is very effective for filtering lead fumes.

In filter type respirators, at inspiration the extraneous substances are adsorbed by the filter material and at exhalation the major part of the adsorbed particles are released, which is due to the reversal of pressure upon the said filter material. The released particles emanate from the filter and therefore the user of the respirator is protected from inhalation of the said separated particle.

This invention is a modification of my coponding applications for Letters Patent, Serial Numbers 17,155 and 45,102.

Having thus described my invention I claim as new and desire Letters Patent as follows.

1. A process for increasing the efficiency of porous filtering material, for filter type respirators, comprising impregnating the material with a dilute colloidal solution of silver and protein as described in the foregoing specification.

2. A process for increasing the efficiency of porous filtering material, for filter type respirators, comprising impregnating the material with a dilute solution of silver in colloidal suspension substantially as described in the foregoing specification.

3. A process for increasing the efficiency of porous filtering material for filter type respirators, comprising steps of impregnating the material with a dilute colloidal solution of silver and protein and then heating at 350 to 550 degrees centigrade.

4. A process for increasing the efficiency of porous filtering material for filter type respirators, comprising steps of impregnating the material with a dilute colloidal solution of silver and protein and then heating at 350 to 550 degrees centigrade and under a pressure of 15 to 50 pounds.

5. A process for increasing the efficiency of porous filtering material for filter type respirators, comprising steps of impregnating the material with a dilute solution of silver in colloidal suspension and then heating at 350 to 550 degrees centigrade and under a pressure of 15 to 50 pounds.

6. A process for increasing the efficiency of porous filtering material for filter type respirators, comprising steps of impregnating the material with an acidified solution of a proteolitic enzyme then impregnating the material with a dilute colloidal solution of silver, and then heating at 350 to 550 degrees centigrade.

7. A process for increasing the efficiency of porous filtering material for filter type respirators, comprising impregnating the material with an acidified solution of a proteolitic enzyme.

8. A process for increasing the efficiency of porous filtering material for filter type respirators, comprising impregnating the material with an acidified solution of a proteolitic enzyme and heating at about 40 degrees centigrade for about 30 minutes.

NATHAN SCHWARTZ.